United States Patent
Hayashi et al.

(10) Patent No.: US 8,482,825 B2
(45) Date of Patent: Jul. 9, 2013

(54) IMAGE PROCESSING APPARATUS AND IMAGE PROCESSING METHOD

(75) Inventors: Junichi Hayashi, Kamakura (JP); Masanori Yokoi, Yokohama (JP); Koji Harada, Yokohama (JP)

(73) Assignee: Canon Kabushiki Kaisha, Tokyo (KR)

( * ) Notice: Subject to any disclaimer, the term of this patent is extended or adjusted under 35 U.S.C. 154(b) by 96 days.

(21) Appl. No.: 13/287,693

(22) Filed: Nov. 2, 2011

(65) Prior Publication Data

US 2012/0127545 A1    May 24, 2012

(30) Foreign Application Priority Data

Nov. 19, 2010  (JP) .................. 2010-259520

(51) Int. Cl.
*H04N 1/46* (2006.01)
(52) U.S. Cl.
USPC .......................................... 358/515; 358/1.9
(58) Field of Classification Search
USPC .................................. 358/515, 150
See application file for complete search history.

(56) References Cited

U.S. PATENT DOCUMENTS

| 2004/0255808 | A1  | 12/2004 | Nagashima |
| 2005/0128498 | A1* | 6/2005  | Matsuzaki ................. 358/1.9 |

FOREIGN PATENT DOCUMENTS

JP          3544536 B2    7/2004

OTHER PUBLICATIONS

U.S. Appl. No. 13/277,064 by Koji Harada, filed Oct. 19, 2011.
U.S. Appl. No. 13/284,719 by Masanori Yokoi, filed Oct. 28, 2011.

* cited by examiner

*Primary Examiner* — Tammy Pham
*Assistant Examiner* — Bharatkumar Shah
(74) *Attorney, Agent, or Firm* — Fitzpatrick, Cella, Harper & Scinto

(57) ABSTRACT

When a lightness level expressed by a selected pixel value is equal to or larger than a threshold, the use amounts of respective color materials of a first color material group, and those of respective color materials of a third color material group are stored in a memory in association with the selected pixel value. On the other hand, when the lightness level expressed by the selected pixel value is smaller than the threshold, the use amounts of respective color materials of the first color material group, and those of respective color materials of a second color material group are stored in the memory in association with the selected pixel value.

6 Claims, 14 Drawing Sheets

FIG. 1A
FIG. 1B
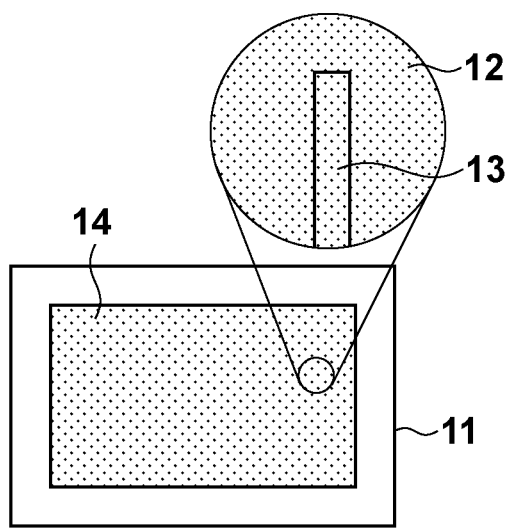
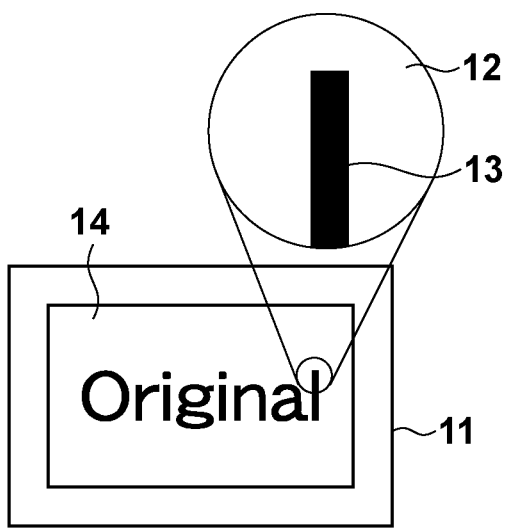
FIG. 1C
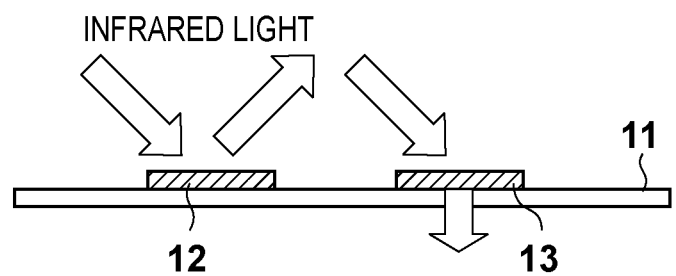
FIG. 1D
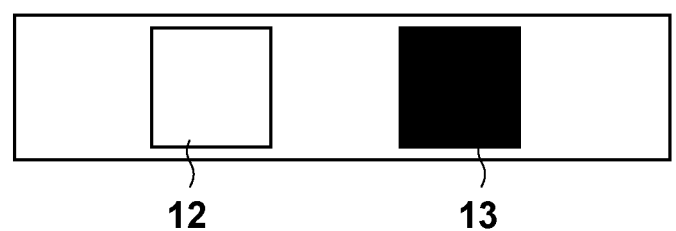

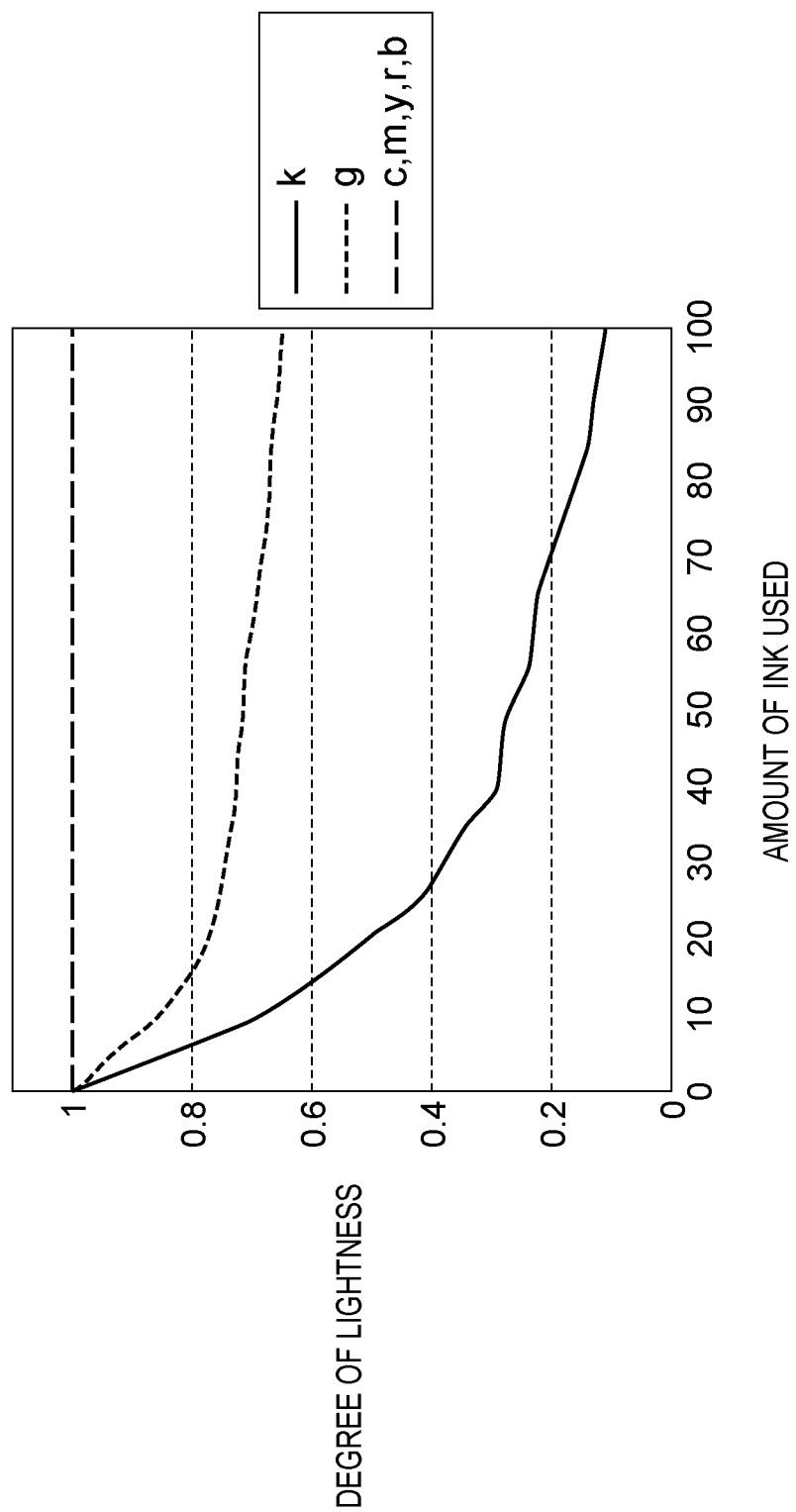

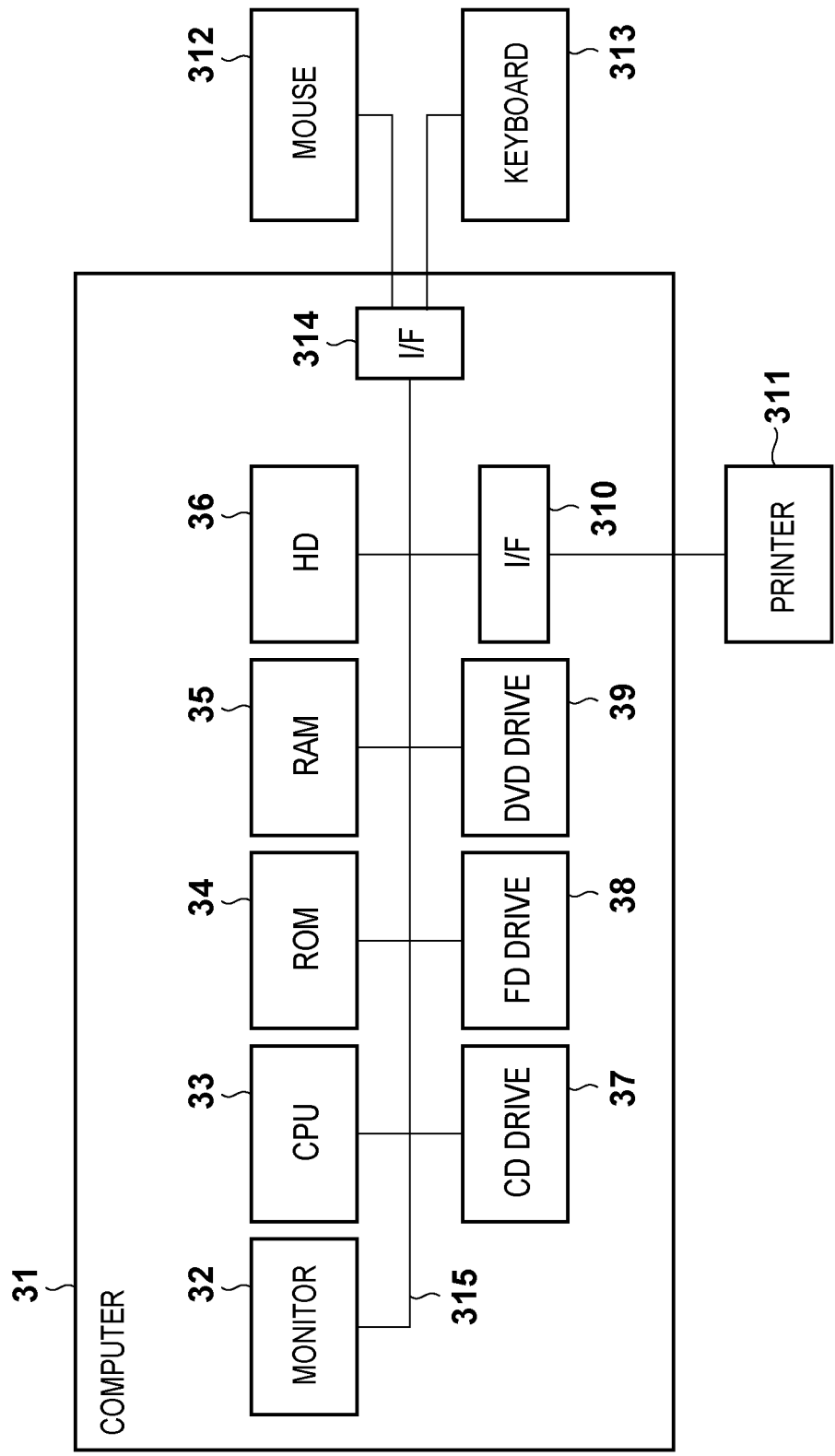

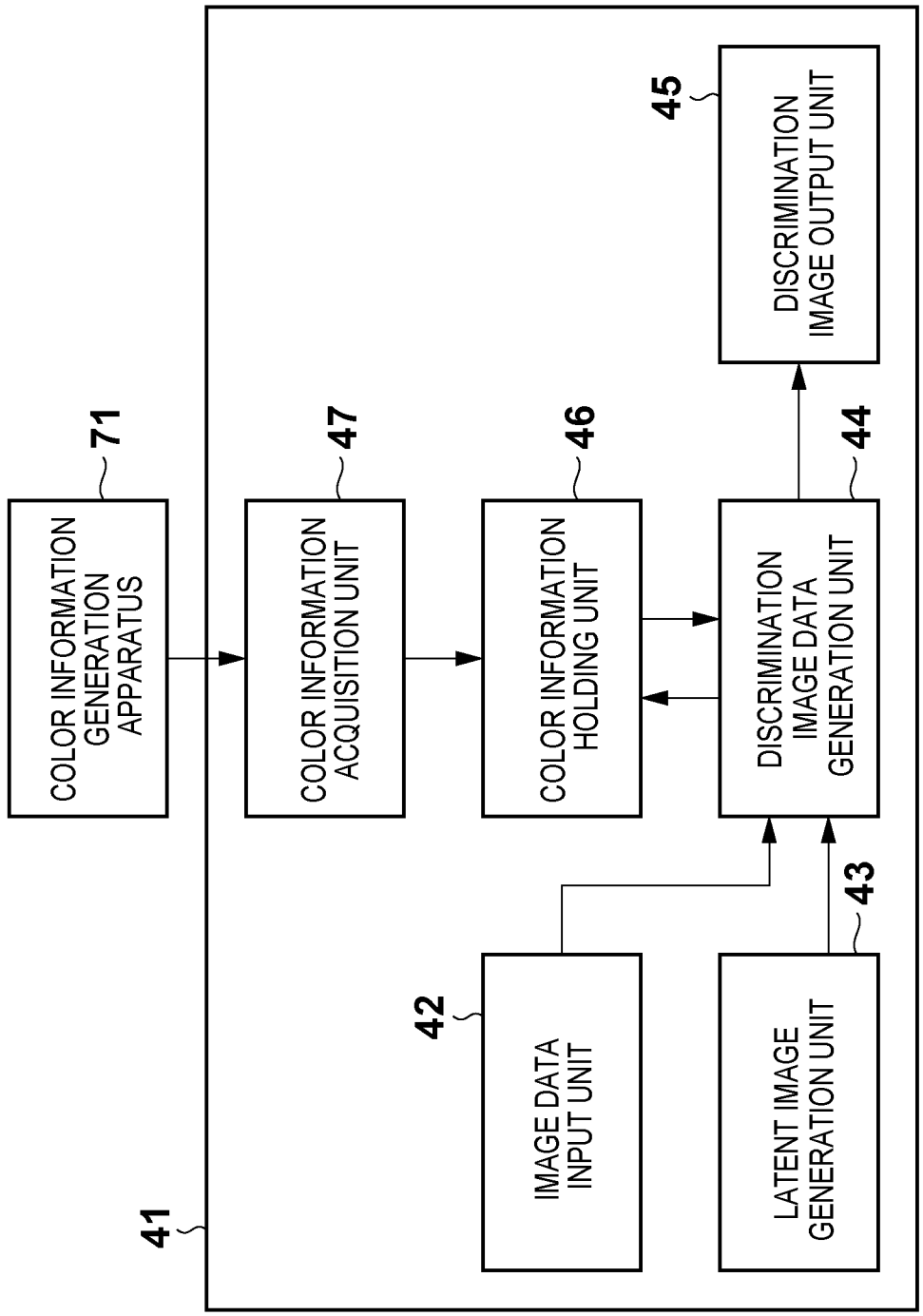

FIG. 9A

| AMOUNT OF INK USED ||| COLOR MEASUREMENT DATA |||
|---|---|---|---|---|---|
| C | M | Y | L* | a* | b* |
| C11 | M11 | Y11 | L*11 | a*11 | b*11 |
| C12 | M12 | Y12 | L*12 | a*12 | b*12 |
| : | : | : | : | : | : |

FIG. 9B

| AMOUNT OF INK USED | COLOR MEASUREMENT DATA |||
|---|---|---|---|
| K | L* | a* | b* |
| K21 | L*21 | a*21 | b*21 |
| K22 | L*22 | a*22 | b*22 |
| : | : | : | : |

FIG. 9C

| AMOUNT OF INK USED || COLOR MEASUREMENT DATA |||
|---|---|---|---|---|
| K | G | L* | a* | b* |
| K31 | G31 | L*31 | a*31 | b*31 |
| K32 | G32 | L*32 | a*32 | b*32 |
| : | : | : | : | : |

FIG. 11A

| PIXEL VALUE | FIRST COLOR | | | SECOND COLOR | |
|---|---|---|---|---|---|
| | C | M | Y | G | K |
| .. | .. | .. | .. | .. | .. |
| (R1, G1, B1) | 20 | 20 | 20 | 0 | 20 |
| .. | .. | .. | .. | .. | .. |
| (R2, G2, B2) | 6 | 6 | 6 | 2 | 4 |
| .. | .. | .. | .. | .. | .. |

LIGHTNESS: LOWER ← TH_L' → HIGHER

FIG. 11B

| PIXEL VALUE | FIRST COLOR | | | SECOND COLOR | |
|---|---|---|---|---|---|
| | C | M | Y | G | K |
| .. | .. | .. | .. | .. | .. |
| (R1, G1, B1) | 20 | 20 | 20 | 0 | 20 |
| .. | .. | .. | .. | .. | .. |
| (R2, G2, B2) | 20 | 20 | 20 | 1(2) | 8 |
| .. | .. | .. | .. | .. | .. |
| (R3, G3, B3) | 6 | 6 | 6 | 2 | 4 |
| .. | .. | .. | .. | .. | .. |

LIGHTNESS: LOWER ← TH_L' ← TH2_L' → HIGHER

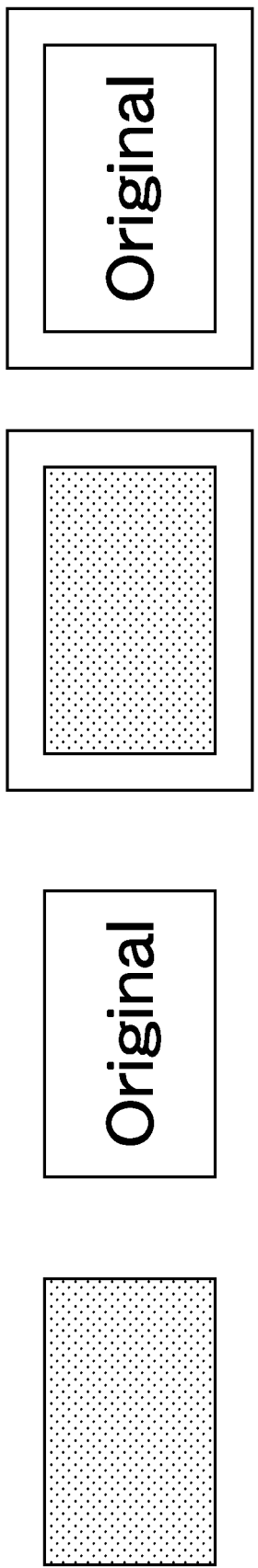

IMAGE PROCESSING APPARATUS AND IMAGE PROCESSING METHOD

FIELD OF THE INVENTION

The present invention relates to a technique for visualizing patterns and characters on a printing medium.

DESCRIPTION OF THE RELATED ART

As an anti-counterfeit technique or authenticity determination technique of printed matters, a printing method for generating a printed matter which cannot be visually recognized (or is hard to be visually recognized) under ordinary light but can be easily discriminated using a device such as an infrared camera sensitive to an infrared range under infrared light is available.

As a representative printing method, a method disclosed in patent literature 1 (Japanese Patent No. 3544536) is known. This method uses the fact that only a black (k) ink of inks with color components cyan (c), magenta (m), yellow (y), and black (k) used in general print processing has large infrared absorption characteristics. That is, an image is printed on a printing medium using black (k) having large infrared absorption characteristics for a latent image region, and using cyan (c), magenta (m), and yellow (y) having small infrared absorption characteristics for a background region. Then, the output printing medium is irradiated with infrared light, and a latent image is discriminated using an infrared camera.

According to the method described in patent literature 1, when the latent image region and background region are set to have a high lightness level (to be bright) under ordinary light, the amount of black (K) ink used on the latent image region has to be inevitably reduced. However, when the amount of black (K) ink used on the latent image region is reduced, an infrared absorption effect on the latent image region is reduced, resulting a small lightness difference between the latent image region and background region under infrared light.

On the other hand, when a large lightness difference between the latent image region and background region under infrared light is to be set, the amount of black (K) ink used on the latent image region has to be inevitably increased. When the amount of black (K) ink used on the latent image region is increased, the latent image region and background region have a low lightness level (to be dark) under ordinary light.

That is, according to patent literature 1, it is difficult to form an ink combination which sets a high lightness level of the latent image region and background region (to be bright) under ordinary light, and sets a large lightness difference between the latent image region and background region under infrared light.

SUMMARY OF THE INVENTION

The present invention has been made in consideration of the aforementioned problems, and provides a technique required to obtain a combination of color materials, which sets a high lightness level of a latent image region and background region (to be bright) under ordinary light, and sets a large lightness difference between the latent image region and background region under infrared light.

According to the first aspect of the present invention, an image processing apparatus comprises: a first holding unit that holds sets of color values acquired by measuring, in advance, colors of patterns printed using a first color material group including color materials of a plurality of colors by use amounts being set for the respective color materials, and the use amounts being set for the respective color materials of the first color material group, for respective combinations of use amounts being allowed to be set for the respective color materials of the first color material group; a second holding unit that holds sets of color values acquired by measuring, in advance, colors of patterns printed using a second color material group, which includes a color material having a higher infrared ray absorption rate than any of the plurality of color materials, by use amounts of being set for respective color materials included in the second color material group, and the use amounts being set for the respective color materials of the second color material group, for respective combinations of use amounts being allowed to be set for the respective color materials of the second color material group; a third holding unit that holds sets of color values acquired by measuring, in advance, colors of patterns printed using a third color material group, which includes a color material having a higher lightness level than any of the color materials included in the second color material group and a higher infrared ray absorption rate than any of the plurality of color materials, and a color material having a higher infrared ray absorption rate than any of the plurality of color materials, by use amounts of being set for respective color materials included in the third color material group, and use amounts being set for the respective color materials of the third color material group, for respective combinations of use amounts being allowed to be set for the respective color materials of the third color material group; a unit that selects one pixel value from a pixel value group, which is set in advance, as a selected pixel value; a first calculation unit that specifies color values, differences from a color value of the selected pixel value of which fall within a prescribed range, from a color value group held by the first holding unit on a color space to which the color value group belongs, specifies use amounts held by the first holding unit to be set with the specified color values, and calculates use amounts of respective color materials used when a pixel having the selected pixel value is printed using the first color material group by interpolation from the specified use amounts; a second calculation unit that specifies color values, differences from the color value of the selected pixel value of which fall within a prescribed range, from a color value group held by the second holding unit on a color space to which the color value group belongs, specifies use amounts held by the second holding unit to be set with the specified color values, and calculates use amounts of respective color materials used when a pixel having the selected pixel value is printed using the second color material group by interpolation from the specified use amounts; a third calculation unit that specifies color values, differences from the color value of the selected pixel value of which fall within a prescribed range, from a color value group held by the third holding unit on a color space to which the color value group belongs, specifies use amounts held by the third holding unit to be set with the specified color values, and calculates use amounts of respective color materials used when a pixel having the selected pixel value is printed using the third color material group by interpolation from the specified use amounts; and a storage unit that stores, in a memory, the use amounts of the respective color materials of the first color material group calculated by the first calculation unit, and the use amounts of the respective color materials of the third color material group calculated by the third calculation unit in association with the selected pixel value, when a lightness level expressed by the selected pixel value is not less than a threshold, and stores, in the memory, the use amounts of the respective color materials of the first color material group calculated by the first calculation unit and the use amounts of the respective color materials of the second color material group calculated by the second calculation unit in association with the selected pixel value, when the lightness level expressed by the selected pixel value is smaller than the threshold.

According to the second aspect of the present invention, an image processing method executed by an image processing apparatus, which comprises: a first holding unit that holds sets of color values acquired by measuring, in advance, colors of patterns printed using a first color material group including color materials of a plurality of colors by use amounts being set for the respective color materials, and the use amounts being set for the respective color materials of the first color material group, for respective combinations of use amounts being allowed to be set for the respective color materials of the first color material group; a second holding unit that holds sets of color values acquired by measuring, in advance, colors of patterns printed using a second color material group, which includes a color material having a higher infrared ray absorption rate than any of the plurality of color materials, by use amounts of being set for respective color materials included in the second color material group, and the use amounts being set for the respective color materials of the second color material group, for respective combinations of use amounts being allowed to be set for the respective color materials of the second color material group; and a third holding unit that holds sets of color values acquired by measuring, in advance, colors of patterns printed using a third color material group, which includes a color material having a higher lightness level than any of the color materials included in the second color material group and a higher infrared ray absorption rate than any of the plurality of color materials, and a color material having a higher infrared ray absorption rate than any of the plurality of color materials, by use amounts of being set for respective color materials included in the third color material group, and use amounts being set for the respective color materials of the third color material group, for respective combinations of use amounts being allowed to be set for the respective color materials of the third color material group, the method comprising: a step of selecting one pixel value from a pixel value group, which is set in advance, as a selected pixel value; a first calculation step of specifying color values, differences from a color value of the selected pixel value of which fall within a prescribed range, from a color value group held by the first holding unit on a color space to which the color value group belongs, specifying use amounts held by the first holding unit to be set with the specified color values, and calculating use amounts of respective color materials used when a pixel having the selected pixel value is printed using the first color material group by interpolation from the specified use amounts; a second calculation step of specifying color values, differences from a color value of the selected pixel value of which fall within a prescribed range, from a color value group held by the second holding unit on a color space to which the color value group belongs, specifying use amounts held by the second holding unit to be set with the specified color values, and calculating use amounts of respective color materials used when a pixel having the selected pixel value is printed using the second color material group by interpolation from the specified use amounts; a third calculation step of specifying color values, differences from a color value of the selected pixel value of which fall within a prescribed range, from a color value group held by the third holding unit on a color space to which the color value group belongs, specifying use amounts held by the third holding unit to be set with the specified color values, and calculating use amounts of respective color materials used when a pixel having the selected pixel value is printed using the third color material group by interpolation from the specified use amounts; and a storage step of storing, in a memory, the use amounts of the respective color materials of the first color material group calculated in the first calculation step, and the use amounts of the respective color materials of the third color material group calculated in the third calculation step in association with the selected pixel value, when a lightness level expressed by the selected pixel value is not less than a threshold, and storing, in the memory, the use amounts of the respective color materials of the first color material group calculated in the first calculation step and the use amounts of the respective color materials of the second color material group calculated in the second calculation step in association with the selected pixel value, when the lightness level expressed by the selected pixel value is smaller than the threshold.

According to the third aspect of the present invention, an image processing apparatus for outputting print image data to a print unit that prints an image by adhering printing color materials to a printing medium, the apparatus comprises: a holding unit that holds first color information configured by a combination of color materials having a low infrared absorption rate, and second color information configured by a combination of at least two types of color materials, which have a high infrared absorption rate and have different tinctures under ordinary light, each of the first color information and the second color information setting a color difference under ordinary light to be not more than a threshold, which is set in advance; a generation unit that generates binary latent image data; and an output unit that outputs, according to a value of each pixel of the latent image data generated by the generation unit, one of the first color information and the second color information held by the holding unit to the print unit as print data of that pixel, wherein the color materials included in the first color information include a color material having a higher lightness level than a color material having a largest lightness level as a single color material of the color materials included in the second color information, and the second color information is configured by a combination of first color materials when a lightness level of the second color information under ordinary light is not less than a threshold, and is configured by a combination of second color materials when the lightness level is smaller than the threshold.

Further features of the present invention will become apparent from the following description of exemplary embodiments with reference to the attached drawings.

BRIEF DESCRIPTION OF THE DRAWINGS

FIGS. 1A to 1D are views for explaining a basic concept of an embodiment;

FIG. 2 is a graph showing degrees of lightness with respect to changes in amount of ink used per unit area of respective unicolor inks;

FIG. 3 is a block diagram showing an example of the hardware arrangement of a computer 31;

FIG. 4 is a block diagram showing an example of the functional arrangement of an image generation apparatus 41;

FIGS. 9A to 9C are views showing configuration examples of color measurement tables;

FIGS. 11A and 11B are views showing configuration examples of color information; and FIGS. 12A to 12D are views showing a print target image, latent image, discrimination image under ordinary light, and discrimination image under infrared light.

DESCRIPTION OF THE EMBODIMENTS

Figure 5A:
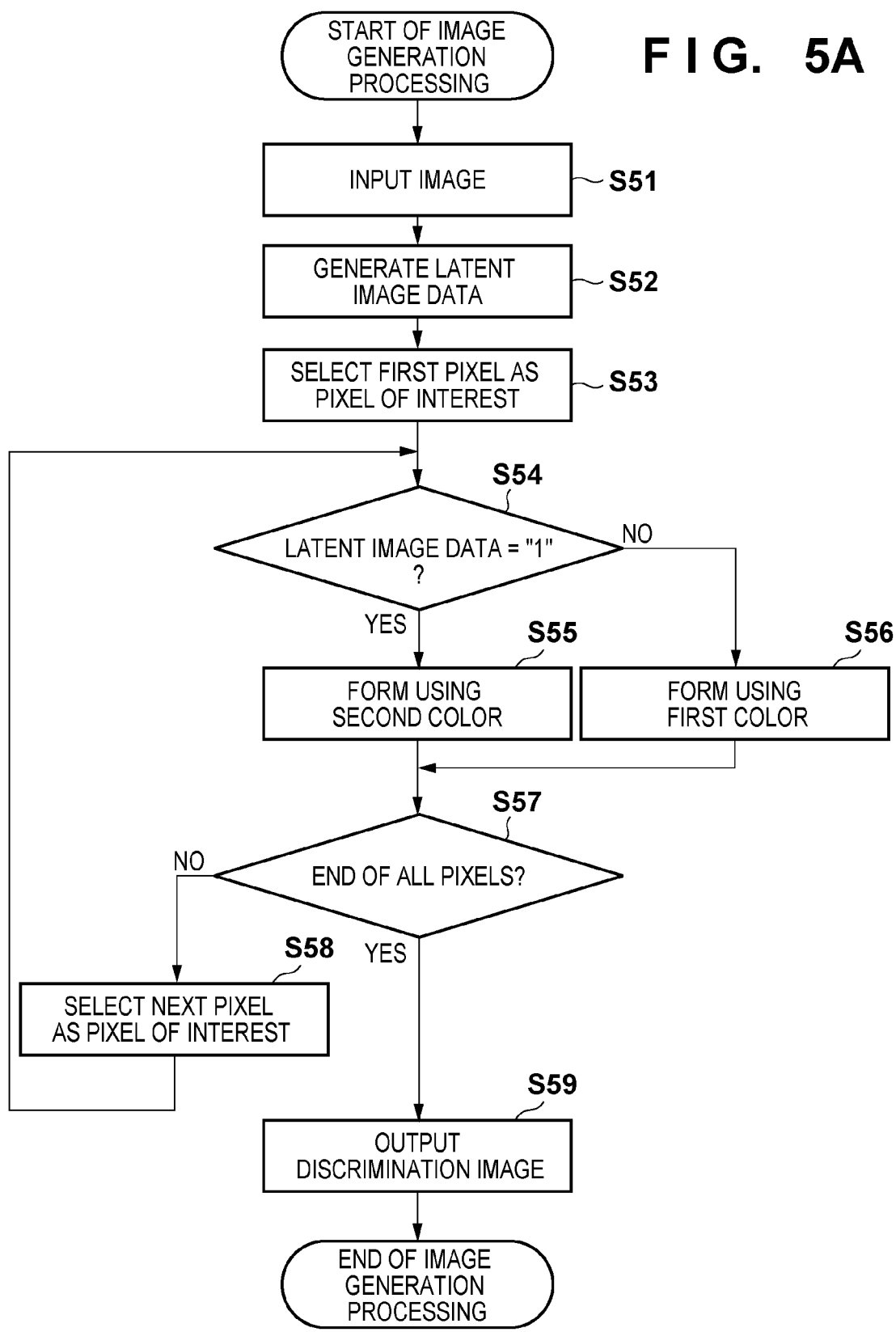
FIGS. 5A and 5B are flowcharts of processing to be executed by the image generation apparatus 41.

Embodiments of the present invention will be described hereinafter with reference to the accompanying drawings. Note that an embodiment to be described hereinafter is an example when the present invention is practically carried out, and is one of practical embodiments of the arrangements described in the scope of the claims.

[First Embodiment]
<Basic Concept>

The basic concept of this embodiment will be briefly described first with reference to FIGS. 1A to 1D. Referring to FIG. 1C, a first region 12 is printed on a printing medium 11 using an ink having small infrared absorption characteristics (low infrared ray absorption rate). A second region 13 is printed on the printing material 11 using an ink having a high infrared ray absorption rate. When this printing medium 11 is irradiated with infrared light, the first region 12 reflects the infrared light since it has the low infrared ray absorption rate, and the second region 13 absorbs the infrared light since it has the high infrared ray absorption rate. Therefore, when this printing medium 11 is observed using an infrared camera while it is irradiated with the infrared light, the first region 12 is observed to have a high lightness level, and the second region 13 is observed to have a low lightness level, as shown in FIG. 1D.

Assume that a discrimination image 14 including a region of characters, a pattern, a mark, or the like (latent image region) as the second region 13, and a region (background region) other than the second region 13 as the first region 12 is formed on the printing medium 11. At this time, even when the printing medium 11 is observed under ordinary light, the second region 13 on the discrimination image 14 cannot be visually recognized (or it is hard to be visually recognized), as shown in FIG. 1A. However, when this printing medium 11 is observed using a special discrimination device such as an infrared camera under infrared light, a text portion "Original" (second region 13) on the discrimination image 14 is visualized, as shown in FIG. 1B. In this case, ordinary light is D50 as light for colorimetry, a relative spectral distribution of which is specified by CIE (Commission Internationale de l'Eclairage).

This technique can attain the following authenticity determination. That is, for example, when the printing medium 11 is irradiated with infrared light, and a specific latent image is confirmed on the printing medium 11, it is determined that the printing medium 11 is authentic; when no latent image is confirmed, it is determined that the printing medium 11 is inauthentic.

Of four basic color inks, that is, cyan (c), magenta (m), yellow (y), and black (k) used in general print processing, black (k) is a black color material mainly containing carbon black, and has higher absorption of infrared light (infrared absorption characteristics are large). By contrast, cyan (c), magenta (m), and yellow (y) have lower absorption of infrared light (infrared absorption characteristics are small), as is known.

Therefore, when the second region 13 is printed using black (k), and the first region 12 is printed using cyan (c), magenta (m), and yellow (y), the first region 12 is observed to have a high lightness level, and the second region 13 is observed to have a low lightness level under infrared light, as described above. Furthermore, in order to obscure a color difference between the first region 12 and second region 13 under ordinary light, the first region 12 can be printed using a combination of cyan (c), magenta (m), and yellow (y) to have nearly the same color as that of the second region 13.

Note that recently, a printing apparatus, which also mounts three expansion color inks, that is, red (r), green (g), and blue (b) in addition to the aforementioned four basic color inks, so as to expand a color gamut that can be expressed, is available. It is known that green (g) of these three expansion color inks is a green color material mainly containing copper and chromium, and absorbs infrared light.

FIG. 2 shows a graph which expresses degrees of lightness (ordinate) with respect to changes in amount of ink used per unit area (abscissa) of respective unicolor inks (cyan, magenta, yellow, black, red, green, and blue). This graph is obtained by printing a plurality of measurement patches whose amounts of ink used per unit area are changed for respective unicolor inks on a printing medium, measuring lightness levels using an infrared camera in an environment in which the patches are irradiated with infrared light, and converting numerical values into a graph. Note that a lightness level of the printing medium on which the measurement patches are printed is defined as "1". As can be confirmed from this graph, the infrared ray absorption rates of black and green are higher than the remaining inks, and degrees of lightness are different depending on ink types even when the amount of ink used remains the same. Also, as can be seen from this graph, the degree of lightness is decreased with increasing amount of ink used.

This embodiment focuses attention on the aforementioned infrared ray absorption rate differences of inks, and provides a technique required to obtain an ink combination which sets a high lightness level of the latent image region and background region (to be bright) under ordinary light, and sets a large lightness difference between the latent image region and background region under infrared light.

In the following embodiment, the first region will be explained as the background region, and the second region will be explained as the latent image region. Alternatively, when the first region is read as the latent image region and the second region is read as the background region, the following description can be similarly applied.

<Image Generation Apparatus>

An image generation apparatus required to generate the aforementioned discrimination image will be described below. An example of the functional arrangement of the image generation apparatus will be described first with reference to the block diagram of FIG. 4. An image generation apparatus 41 decides pixel values of respective pixels, which form a discrimination image, according to amounts of ink used indicated by color information acquired from a color information generation apparatus 71 (image processing apparatus).

An image data input unit 42 acquires a print target image. This print target image is a multi-valued image, each pixel of which has an RGB value (pixel value), and is used as, for example, a counterfeit suppression target image. The acquisition method of the print target image is not particularly limited. For example, information printed on a printing medium is scanned using a scanner to acquire a print target image. Alternatively, an image recorded in a memory may be acquired as a print target image. When print data such as PDL data is acquired, the PDL data may be expanded to form a print target image. Irrespective of a method to be adopted, the image data input unit 42 may acquire a print target image by an arbitrary method as long as the print target image can be acquired.

In the following description, assume that the print target image is a unicolor image shown in FIG. 12A for the sake of simplicity. However, even when an arbitrary image is used as the print target image, the following description can be similarly applied.

A latent image generation unit 43 acquires or generates a latent image required to discriminate whether each pixel on the print target image is that of a latent image region or that of a background region. The latent image used in this embodiment is a binary image which can be handled in pixel units, a pixel which configures a latent image portion such as a pattern or text portion has a pixel value "1", and a pixel which configures a region other than this portion has a pixel value "0". However, any other kinds of information may be used as a latent image as long as it is information required to discriminate whether each pixel on the print target image is a pixel of the latent image region or that of the background region. In other words, the latent image is configured by pieces of information each designating whether each pixel on the print target image belongs to the first or second region described above.

For example, assume that the latent image is an image described with characters "Original", as shown in FIG. 12B. In this case, a pixel value of each pixel which configures each character is "1", and that of a pixel which does not configure any character is "0". Note that a binary image may be generated based on rendering information used to render a pattern or characters, and may be used as a latent image. When a latent image is generated using a character string, the latent image can be generated by expanding this character string as a binary image using an appropriate font.

Figure 6A:
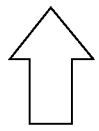
FIGS. 6A to 6C are views showing processing examples of a latent image.
Figure 6B:
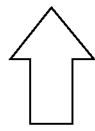
Figure 6C:

Also, assume that the vertical and horizontal sizes of the latent image are the same as those of the print target image. However, for example, if the vertical and horizontal sizes of the latent image are smaller than those of the print target image, the latent image is enlarged, as shown in FIG. 6A. If the vertical and horizontal sizes of the latent image are larger than those of the print target image, the latent image is reduced, as shown in FIG. 6B. Also, an image prepared by repetitively pasting the latent image within a region of the size of the print target image (or within a partial region), as shown in FIG. 6C, may be used anew as the latent image. Furthermore, at the time of reduction or pasting, the latent image may be rotated through an appropriate angle.

A color information acquisition unit 47 acquires color information (to be described later) transmitted from the color information generation apparatus 71, and stores the acquired color information in a color information holding unit 46. Note that the color information generation apparatus 71 may be incorporated in the image generation apparatus 41, and the color information acquisition unit 47 may acquire color information, which is generated by the color information generation apparatus 71 as needed, and may store that information in the color information holding unit 46.

The color information will be described below. The color information is configuration information indicating inks and amounts (amounts of ink used) to be used on a printing medium so as to express a color of each of pixel values (RGB values). As shown in FIG. 11A, in the color information, amounts of ink used of respective inks used to print a color (first color C1) of the background region and those of respective inks used to print a color (second color C2) of the latent image region are registered for respective pixel values (RGB values). For example, when a pixel value of a pixel of interest in the print target image is (R2, G2, B2), and this pixel of interest is that in the background region, the amounts of ink used of respective inks that are used to print this pixel of interest are C=M=Y=6. When this pixel of interest is that in the latent image region, the amounts of ink used of respective inks used to print this pixel of interest are G=2 and K=4. A ratio of each color ink when a maximum amount of an ink adhered per unit area on a printing medium is 100 is defined as "amount of ink used". Note that the types of inks used to print the first color C1 and those of inks used to print the second color C2 will be described later.

A discrimination image data generation unit 44 discriminates using the latent image acquired from the latent image generation unit 43 whether each pixel which forms the print target image acquired from the image data input unit 42 is that of the latent image region or that of the background region. Then, the discrimination image data generation unit 44 specifies amounts of ink used for each pixel using the color information held by the color information holding unit 46 depending on whether each pixel belongs to the background region or latent image region. That is, the discrimination image data generation unit 44 generates a discrimination image in which a pixel value of each pixel represents amounts of ink used corresponding to each pixel of the print target image. In other words, a pixel value at a position P of a pixel of interest on the discrimination image represents amounts of ink used specified for a position P of a pixel of interest on the print target image.

A discrimination image output unit 45 outputs the discrimination image generated by the discrimination image data generation unit 44 to a printing apparatus such as a printer, a memory managed by itself, and the like. In the following description of this embodiment, the discrimination image is to be output to the printing apparatus. However, an output destination is not particularly limited. Note that when the discrimination image is printed on a printing medium using the printing apparatus, this discrimination image is observed under ordinary light, as shown in FIG. 12C, and the latent image region on the discrimination image cannot be visually recognized (or it is hard to be visually recognized). However, when this printing medium is observed under infrared light using a special discrimination device such as an infrared camera, a text portion "Original" (latent image region) on the discrimination image is visualized, as shown in FIG. 12D.

<Processing Executed by Image Generation Apparatus 41>

Processing to be executed by the image generation apparatus 41 will be described below with reference to FIG. 5A which shows the flowchart of that processing. In step S51, the image data input unit 42 acquires a print target image, and outputs the acquired print target image to the discrimination image data generation unit 44. In step S52, the latent image generation unit 43 generates or acquires the aforementioned latent image, and outputs the generated or acquired latent image to the discrimination image data generation unit 44.

In step S53, the discrimination image data generation unit 44 refers to one pixel from the latent image acquired from the latent image generation unit 43. Pixels can be referred to in a raster scan order from, for example, the upper left corner position of the latent image. Hence, when this step is executed for the first time, the discrimination image data generation unit 44 refers to a pixel at the upper left corner position of the latent image in this step.

The discrimination image data generation unit 44 judges in step S54 whether or not a pixel value of the pixel referred to in step S53 is "1". As a result of this judgment, if the pixel value is "1", the process advances to step S55; if it is "0", the process advances to step S56.

In step S55, letting R be a position of the pixel referred to in step S53, the discrimination image data generation unit 44 sets a pixel at the position R on the print target image as that within the latent image region. Then, the discrimination image data generation unit 44 refers to the color information, which is acquired by the color information acquisition unit 47 and is stored in the color information holding unit 46, and sets the amounts of ink used, which correspond to the pixel value of the pixel at the position R on the print target image and are used to print the second color, as pixel information at the position R of a discrimination image. For example, when the pixel value of the referred pixel is (R1, G1, B1), G=0 and K=20 are set as pixel information at the position R of the discrimination image in the example of FIG. 11A.

In step S56, letting R be a position of the pixel referred to in step S53, the discrimination image data generation unit 44 sets a pixel at the position R on the print target image as that within the background region. Then, the discrimination image data generation unit 44 refers to the color information, which is acquired by the color information acquisition unit 47 and is stored in the color information holding unit 46, and sets the amounts of ink used, which correspond to the pixel value of the pixel at the position R on the print target image and are used to print the first color, as pixel information at the position R of a discrimination image. For example, when the pixel value of the referred pixel is (R1, G1, B1), C=M=Y=20 is set as pixel information at the position R of the discrimination image in the example of FIG. 11A.

The discrimination image data generation unit 44 judges in step S57 whether or not all pixels on the latent image have been referred to (whether or not pieces of pixel information of pixels which configure the discrimination image have been decided). As a result of this judgment, if all the pixels have been referred to, the process advances to step S59; if pixels to be referred to still remain, the process advances to step S58.

In step S58, the discrimination image data generation unit 44 sets a pixel to be referred to as a reference target pixel, and executes the processes in step S54 and subsequent steps. With the above processes, pixel information indicating inks and their amounts is assigned to each of pixels of the discrimination image.

In step S59, the discrimination image data generation unit 44 outputs data of the discrimination image, that is, pieces of pixel information of respective pixels which configure the discrimination image, to the discrimination image output unit 45. Then, the discrimination image output unit 45 outputs this discrimination image to the printing apparatus.

<Color Information Generation Apparatus>

The color information generation apparatus which generates the aforementioned color information will be described below. An example of the functional arrangement of the color information generation apparatus will be described below with reference to the block diagram shown in FIG. 7. The color information generation apparatus 71 calculates amounts of ink used required to print the background region and those required to print the latent image region for respective pixel values.

A pixel value input unit 72 acquires a pixel value group (RGB value group) which is set in advance, for example, a pixel value group that can be used by the printing apparatus or that which is included in the print target image. An acquisition source is not particularly limited, and may be a memory (not shown) in the color information generation apparatus 71 or an external apparatus. Then, the pixel value input unit 72 selects pixel values one by one from the acquired pixel value group, and outputs the selected pixel value to a subsequent color conversion processing unit 73 as a selected pixel value.

The color conversion processing unit 73 converts the pixel value (color component values) output from the pixel value input unit 72 into a device (for example, a printing apparatus)-independent $L^*a^*b^*$ value, and converts this $L^*a^*b^*$ value into a device-dependent $L'^*a'^*b'^*$ value. This means that when the pixel value is converted into common color space data, and the common color space data is converted into color space data that can be expressed by a device, the color of the pixel value is converted into a color which can be output using inks to be used. Note that such color conversion executed by the color conversion processing unit 73 is a state-of-the-art technique, and a description thereof will not be given. Then, the color conversion processing unit 73 outputs the $L'^*a'^*b'^*$ value calculated by the above processing to a color information computing unit 74.

A threshold holding unit 76 holds a threshold to be described later. Note that the threshold may be accepted from the user as needed without being held in advance, or a plurality of thresholds may be held in advance, and may be selectively used according to various conditions.

A measurement data holding unit 75 holds color values ($L^*a^*b^*$ values) acquired by measuring, in advance, colors of patterns printed using a plurality of colors of inks by amounts of ink used set for the respective inks, in association with the amounts of ink used. More specifically, the measurement data holding unit 75 holds a plurality of types of tables (color measurement tables) in which color values corresponding to various amounts of ink used are registered.

The color measurement tables will be described below with reference to FIGS. 9A to 9C. The color measurement table shown in FIG. 9A holds sets of amounts of ink used of C, M, and Y inks (first ink group) and $L^*a^*b^*$ values (color measurement data) acquired by measuring colors of patterns printed using the C, M, and Y inks by respective amounts of ink used (colorimetry), for respective combinations of amounts of ink used, which can be set for respective inks of the first ink group (first holding). Note that this colorimetry is done under ordinary light. For example, when the amounts of ink used of the C, M, and Y inks are respectively C11, M11, and Y11, corresponding color measurement data are $L^*=L^*11$, $a^*=a^*11$, and $b^*=b^*11$.

The color measurement table shown in FIG. 9B holds sets of amounts of ink used of a K ink (second ink group) and $L^*a^*b^*$ values acquired by measuring colors of patterns printed using the K ink by amount of K ink used (colorimetry), for respective combinations of amounts of ink used, which can be set for respective inks of the second ink group (second holding). Note that this colorimetry is also done under ordinary light. For example, when the amount of ink used of the K ink is K21, corresponding color measurement data are $L^*=L^*21$, $a^*=a^*21$, and $b^*=b^*21$.

The color measurement table shown in FIG. 9C holds sets of amounts of ink used of the K and G inks (third ink group) and $L^*a^*b^*$ values acquired by measuring colors of patterns printed using the K and G inks by the respective amounts of those inks used (colorimetry), for respective combinations of amounts of ink used, which can be set for respective inks of the third ink group (third holding). Note that this colorimetry is also done under ordinary light. For example, when the amounts of ink used of the K and G inks are respectively K31 and G31, corresponding color measurement data are L*=L*31, a*=a*31, and b*=b*31.

Note that the color measurement table in which the color measurement data for respective amounts of ink used of the inks (first ink group) having relatively low infrared ray absorption rates are registered, as shown in FIG. 9A, will be referred to as a first color measurement table hereinafter.

Also, the color measurement table in which the color measurement data for respective amounts of ink used of the second ink group including an ink having an infrared ray absorption rate higher than those of all the inks included in the first ink group are registered, as shown in FIG. 9B, will be referred to as a second color measurement table hereinafter. In case of FIG. 9B, an "ink having an infrared ray absorption rate higher than those of all the inks included in the first ink group" indicates the "K" ink.

Furthermore, the color measurement table in which the color measurement data for respective amounts of ink used of the third ink group including an ink having a lightness level higher than that of the ink included in the second ink group and an infrared ray absorption rate higher than those of all the inks included in the first ink group, and an ink having an infrared ray absorption rate higher than those of all the inks included in the first ink group are registered, as shown in FIG. 9C, will be referred to as a third color measurement table hereinafter. In case of FIG. 9C, an "ink having a lightness level higher than that of the ink included in the second ink group and an infrared ray absorption rate higher than those of all the inks included in the first ink group" indicates the "G" ink.

In this embodiment, the second and third color measurement tables include only color measurement data which satisfy a condition that a lightness level under infrared light is lower than a predetermined lightness level. Since color measurement data registered in the first color measurement table are those of the inks having relatively low infrared ray absorption rates, they have higher lightness levels under infrared light. By contrast, since the color measurement data registered in the second and third color measurement tables are those of the inks having relatively high infrared ray absorption rates under the aforementioned condition, they have low lightness levels under infrared light. That is, it should be noted that a given lightness difference or more is generated under infrared light between a region formed using the inks registered in the first color measurement table and a region formed using the ink or inks registered in the second or third color measurement table.

Note that the following description of this embodiment uses the inks shown in FIGS. 9A to 9C. However, the present invention is not limited to this, and various inks which satisfy the aforementioned condition are applicable. For example, the second color measurement table may be created for black (K), and the third color measurement table may be created for a combination of black (K) and cyan (C). It is known that the infrared absorption characteristics of cyan (C) are larger than those of magenta (M), yellow (Y), red (R), and blue (B) although they are smaller than those of black (K) and green (G). Therefore, when the third color measurement table is created for black (K) and cyan (C), a lightness difference is generated under infrared light between a region formed using the inks registered in the first color measurement table and a region formed using the inks registered in the third color measurement table. For the same reason as above, the second color measurement table may be created for green (G), and the third color measurement table may be created for a combination of green (G) and cyan (C). Alternatively, the second color measurement table may be created for a combination of black (K) and green (G), and the third color measurement table may be created for a combination of black (K), green (G), and cyan (C). It should be noted that all these examples satisfy the aforementioned condition.

The color information computing unit 74 generates the color information using the L'*a'*b'* values obtained from the color conversion processing unit 73, the threshold obtained from the threshold holding unit 76, and various color measurement tables held by the measurement data holding unit 75. A color information output unit 77 outputs the color information generated by the color information computing unit 74 to the aforementioned image generation apparatus 41.

<Processing Executed by Color Information Generation Apparatus 71>

Processing to be executed by the color information generation apparatus 71 having the aforementioned arrangement will be described below with reference to FIG. 8A which shows the flowchart of that processing. In step S81, the pixel value input unit 72 selects one pixel value from a pixel value group, which is set in advance, as a selected pixel value. Then, the pixel value input unit 72 outputs this selected pixel value to the color conversion processing unit 73.

In step S82, the color conversion processing unit 73 converts the selected pixel value output from the pixel value input unit 72 into a device (for example, a printing apparatus)-independent L*a*b* value. In step S83, the color conversion processing unit 73 converts the L*a*b* value into a device-dependent L'*a'*b'* value. Then, the color conversion processing unit 73 outputs the calculated L'*a'*b'* value to the color information computing unit 74.

In step S84, the color information computing unit 74 specifies four L*a*b* values close to the L'*a'*b'* value obtained in step S83 of those (color value group) registered in the first color measurement table. This process is equivalent to that for specifying four L*a*b* values within a prescribed range (a color difference range, that is, Euclidean distance range) from the position of the L'*a'*b'* value on a CIE L*a*b* color space of those registered in the first color measurement table.

In step S85, the color information computing unit 74 calculates amounts of ink used of the respective inks, which become equal to the L'*a'*b'* value, from these four L*a*b* values by a known tetrahedral interpolation method (first calculation). The tetrahedral interpolation method of this embodiment will be described below with reference to FIG. 10.

Figure 10:
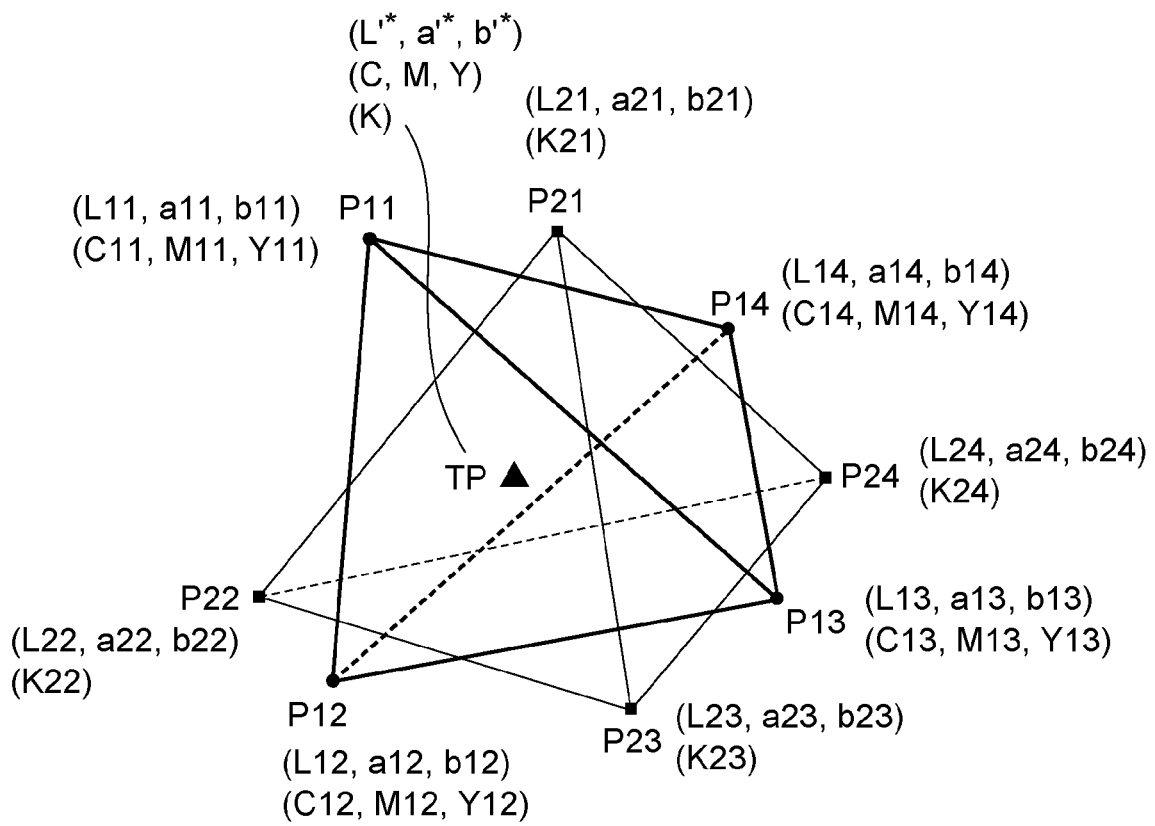
FIG. 10 is a view for explaining tetrahedral interpolation.

In FIG. 10, four points P11, P12, P13, and P14 are specified by plotting the four L*a*b* values on an Lab color space. For example, the point P11 indicates that measurement data on an L*a*b* space are respectively L11, a11, and b11 when amounts of ink used of cyan (C), magenta (M), and yellow (Y) are respectively C11, M12, and Y13. Also, at a point Tp, the L*, a*, and b* values are respectively converted into L'*, a'*, and b'* values (that is, those calculated in step S83). In step S85, amounts of inks used of the C, M, and Y inks at the point Tp are calculated from those at the points P11, P12, P13, and P14 by the tetrahedral interpolation method.

Note that the tetrahedral interpolation method is a state-of-the-art technique, and a description thereof will not be given. Also, this embodiment adopts the tetrahedral interpolation using four points so as to calculate the amounts of ink used of the C, M, and Y inks at the point Tp. Alternatively, interpolation may be made using an arbitrary number of points. In this manner, the amounts of ink used of the respective inks used to print the first color can be decided in step S85.

Referring back to FIG. 8A, in step S86, the color information computing unit 74 acquires a threshold TH_L' held by the threshold holding unit 76, and compares a lightness L' value of the L'*a'*b'* value calculated in step S83 with the threshold TH_L'. As a result of this comparison, if the lightness L' value<the threshold TH_L' (smaller than the threshold), the process advances to step S87; if the lightness L' value≧the threshold TH_L' (equal to or larger than the threshold), the process advances to step S88.

In step S87, the color information computing unit 74 specifies four L*a*b* values close to the L'*a'*b'* value obtained in step S83 of those registered in the second color measurement table. This process is equivalent to that for specifying four L*a*b* values within a prescribed range from the position of the L'*a'*b'* value on the CIE L*a*b* color space of those registered in the second color measurement table.

In step S88, the color information computing unit 74 specifies four L*a*b* values close to the L'*a'*b'* value obtained in step S83 of those registered in the third color measurement table. This process is equivalent to that for specifying four L*a*b* values within a prescribed range from the position of the L'*a'*b'* value on the CIE L*a*b* color space of those registered in the third color measurement table.

When the process advances from step S87 to step S89, the color information computing unit 74 calculates amounts of ink used of respective inks, which become equal to the L'*a'*b'* value, from the four L*a*b* values specified in step S87 by the aforementioned tetrahedral interpolation method (second calculation) in step S89.

When the process advances from step S88 to step S89, the color information computing unit 74 calculates amounts of ink used of respective inks, which become equal to the L'*a'*b'* value, from the four L*a*b* values specified in step S88 by the aforementioned tetrahedral interpolation method (third calculation) in step S89.

In this way, in step S89, the types of inks used to print the second color and the amounts of ink used of the respective inks can be decided. Note that the amount of ink used of G is set to be "0" in step S87 in this embodiment.

The tetrahedral interpolation in step S89 will be described below with reference to FIG. 10. In FIG. 10, four points P21, P22, P23, and P24 are specified by plotting the four L*a*b* values selected from the second color table. For example, the point P21 indicates that measurement data on the L*a*b* space are respectively L21, a21, and b21 when the amount of ink used of black (K) is K21. Note that in this case, since black alone is used, the values a21 and b21 may be close to "0" in practice.

At a point Tp, the L*, a*, and b* values are respectively converted into L'*, a'*, and b'* values (that is, those calculated in step S83). It should be noted that this point Tp is the same as the aforementioned point Tp.

In step S89, the amount of ink used of K at the point Tp is calculated from those at the points P21, P22, P23, and P24 by the tetrahedral interpolation method. That is, the amounts of ink used of C, M, and Y and that of K, which are required to express the L*a*b* value at the point Tp, are calculated in steps S85 and S89. Conversely, since colors formed by the amounts of ink used calculated in steps S85 and S89 have the same L*a*b* value, they seem to be the same color for human eyes.

Note that when the third color measurement table is used (that is, when step S88 is executed), since the points P21, P22, P23, and P24 are specified by plotting the four L*a*b* values selected from the third color measurement table, the same processing can be executed. In this way, the amounts of ink used of C, M, and Y and those of K and G, which are required to express the L*a*b* value at the point Tp, are calculated in steps S85 and S89.

Referring back to FIG. 8A, in step S810, the color information computing unit 74 registers the amounts of ink used calculated in step S85 and those calculated in step S89 in a memory managed by itself in association with the selected pixel value.

If the processes in steps S81 to S810 are complete for all pixel values of the pixel value group which is set in advance, the process advances to step S812 via step S811. On the other hand, if pixels to be processes in steps S81 to S810 of the pixel value group, which is set in advance, still remain, the processes in steps S81 to S810 are repeated for these remaining pixels.

When the processes in steps S81 to S810 are complete for all pixel values of the pixel value group which is set in advance, table information in which amounts of ink used of respective inks used to print the first color and those of respective inks used to print the second color are registered for respective pixel values of the pixel value group, which is set in advance, is generated.

In step S812, the color information computing unit 74 outputs the generated table information to the color information output unit 77 as color information. Then, this color information output unit 77 outputs the color information to the image generation apparatus 41.

This color information indicates that the second color is formed using the K ink alone when the lightness value of each pixel value is smaller than the threshold TH_L', and is formed using the G ink (for example, 2%) and K ink (for example, 4%) when the lightness value is equal to or larger than the threshold TH_L', as exemplified in FIG. 11A. The color information generated in this way is acquired by the color information acquisition unit 47, is held by the color information holding unit 46, and is used when the discrimination image is generated, as described above.

Note that when the value of the threshold TH_L' held by the aforementioned threshold holding unit 76 assumes a minimum lightness value, the third color measurement table can be applied to all pixel values. Conversely, when the value of the threshold TH_L' assumes a maximum lightness value, the second color measurement table can be applied to all pixel values.

As described above, according to this embodiment, even when the second color has a large lightness value, an effect of increasing a lightness difference between the first and second regions under infrared light can be provided.

<Modification 1>

In the first embodiment, when a lightness value is small, the K ink alone is used for the second region; when a lightness value is large, the K and G inks are used for the second region. In such embodiment, the second region having a large lightness value often requires a relatively large amount of the G ink. As a result, in an image region in which lightness values or tinctures change continuously under ordinary light, a pseudo edge is often generated at a boundary between the first and second regions. A modification for suppressing generation of such pseudo edge will be described below.

Figure 8A:
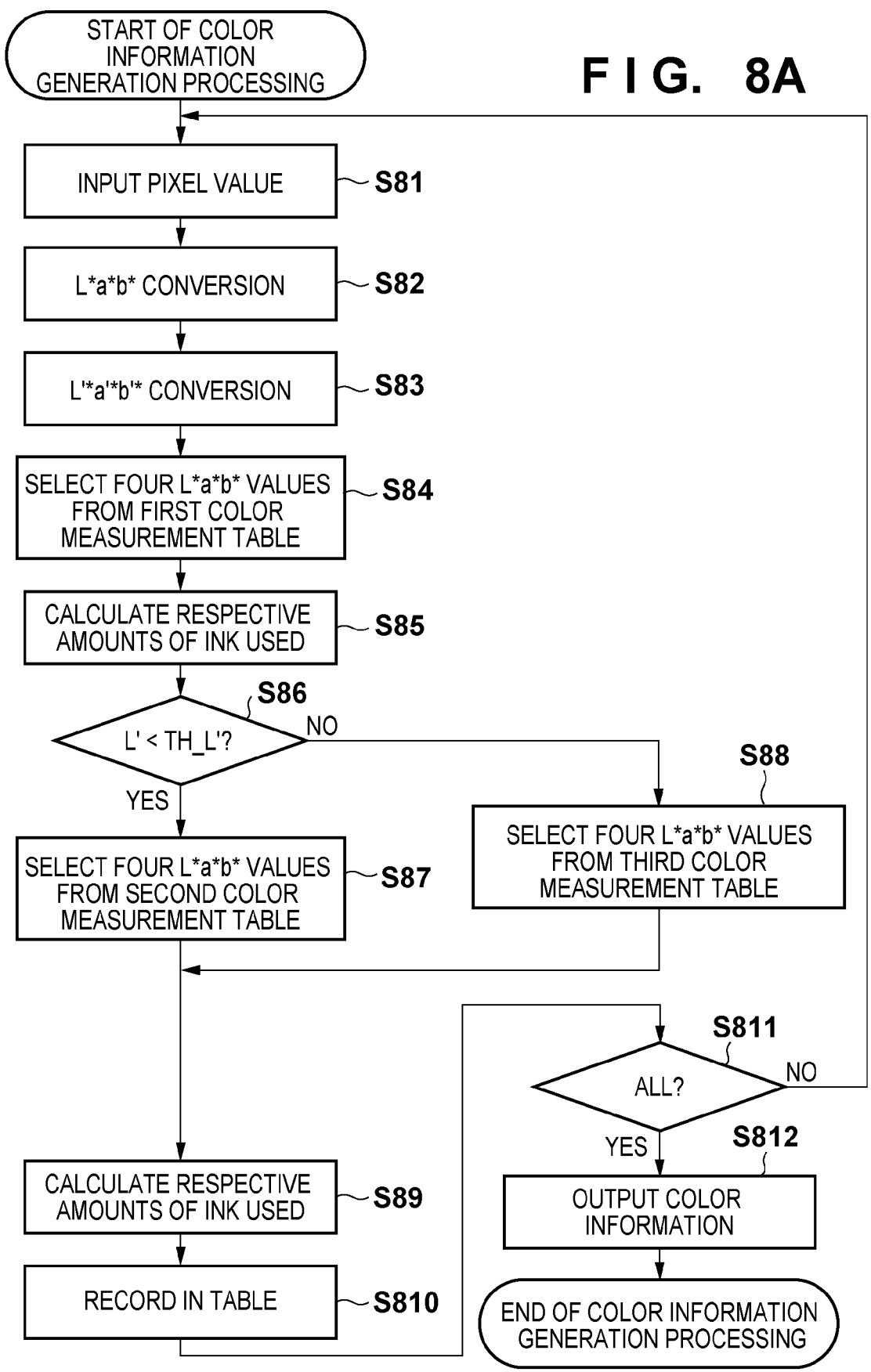
FIGS. 8A and 8B are flowcharts of processing to be executed by the color information generation apparatus 71.
Figure 8B:
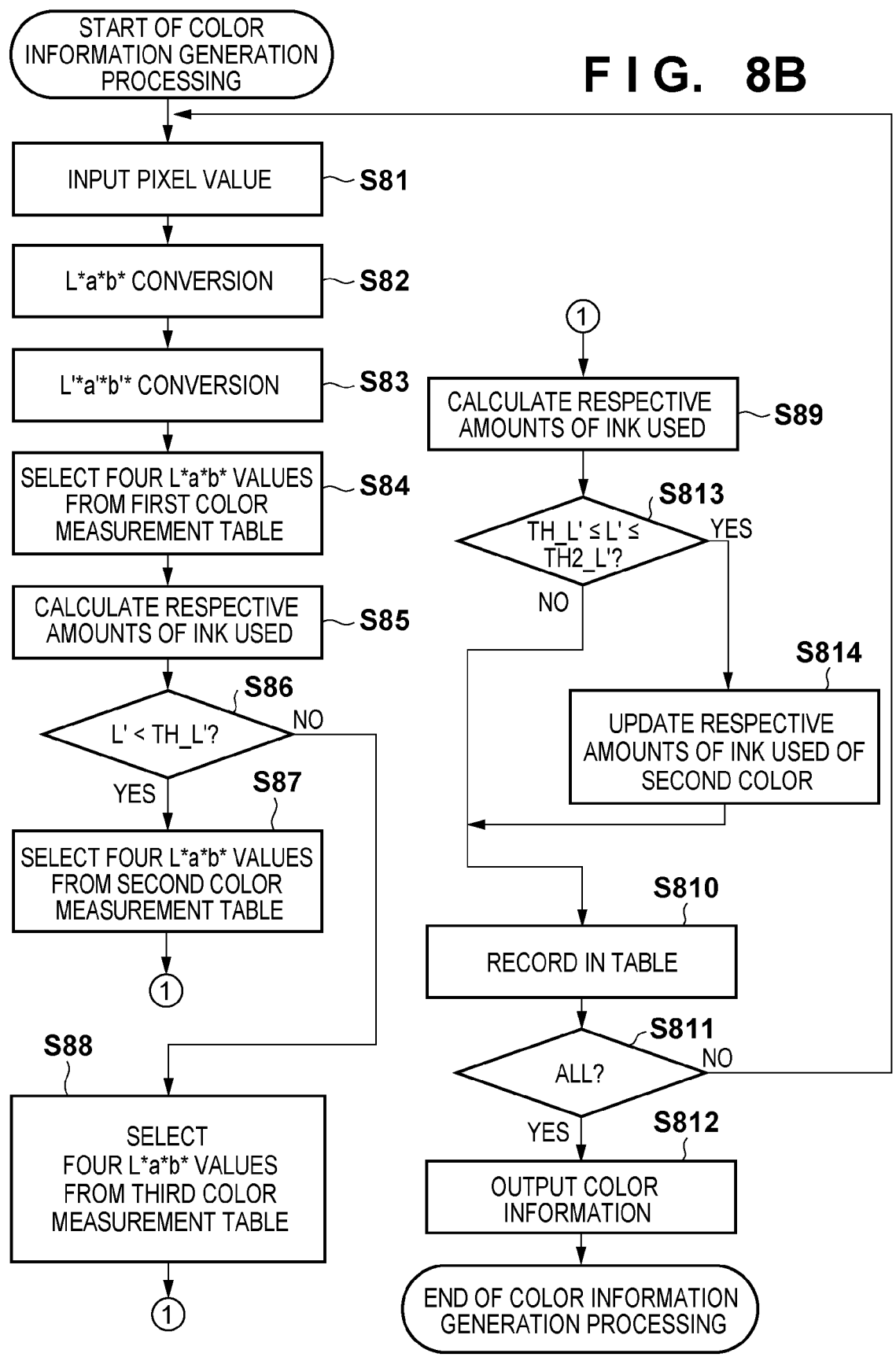

A difference between this modification and first embodiment is that the color information generation apparatus 71 executes processing according to the flowchart shown in FIG. 8B in place of that according to the flowchart shown in FIG. 8A. Hence, the processing shown in FIG. 8B will be described below. Note that the same step numbers in FIG. 8B denote the same steps as those shown in FIG. 8A, and a description thereof will not be repeated.

After the amounts of ink used of the respective inks used to print the second color are calculated in step S89, the color information computing unit 74 acquires a threshold TH2_L'

(>threshold TH_L') held by the threshold holding unit 76 in step S813. Hence, the threshold TH2_L' is registered in advance in the threshold holding unit 76 in addition to the threshold TH_L'. Of course, this threshold TH2_L' may also be edited.

Then, the color information computing unit 74 compares a lightness L* value of the L'*a'*b'* value calculated in step S83 with the thresholds TH_L' and TH2_L'. As a result of this comparison, if a condition [threshold TH_L'≦lightness L'≦threshold TH2_L'] is satisfied, the process advances to step S814; otherwise, the process advances to step S810.

In step S814, the color information computing unit 74 decreases the amount of ink used of the G ink of those of the respective inks calculated in step S89 by a prescribed amount. Note that the amount of ink used of the K ink may be increased simultaneously with the decrease in that of the G ink. Or the amounts of ink used of both the G and K inks may be decreased. In any case, in step S814, the amount of ink used of the ink added to the second color measurement table in the third color measurement table (G in FIG. 9C) is decreased. Then, the process advances to step S810.

FIG. 11B shows a configuration example of the color information generated according to this modification. In the color information shown in FIG. 11A, when a lightness value of a pixel value is smaller than the threshold TH_L', the second color is formed using the K ink alone; when the lightness value is equal to or larger than the threshold TH_L', the second color is formed using the G ink (for example, 2%) and K ink (for example 4%). On the other hand, in FIG. 11B, when the lightness value of a pixel value is smaller than the threshold TH_L', the second color is formed using only the K ink alone in the same manner as in FIG. 11A. However, when the lightness value is equal to or larger than the threshold TH_L' and is equal to or smaller than the threshold TH2_L', the second color is formed using the G ink (for example, 1%) and K ink (for example, 8%). In FIG. 11B, (2) indicates a state before the update processing in step S814. That is, in step S814, the amount of ink used of the G ink is decreased from 2% to 1%. Then, when the lightness value is larger than the threshold TH2_L', the second color is formed using the G ink (for example, 2%) and K ink (for example, 4%). As described above, according to this modification, an effect of suppressing generation of a pseudo edge at a boundary between the first and second regions can be provided.

<Modification 2>

The color information generated in the first embodiment will be referred to as first color information hereinafter, and that generated in modification 1 will be referred to as second color information hereinafter. The first color information prioritizes an increase in lightness difference under infrared light over a color difference (lightness or tincture difference) between the first and second regions under ordinary light. On the other hand, the second color information prioritizes a decrease in tincture under ordinary light over a lightness difference between the first and second regions under infrared light.

Figure 5B:
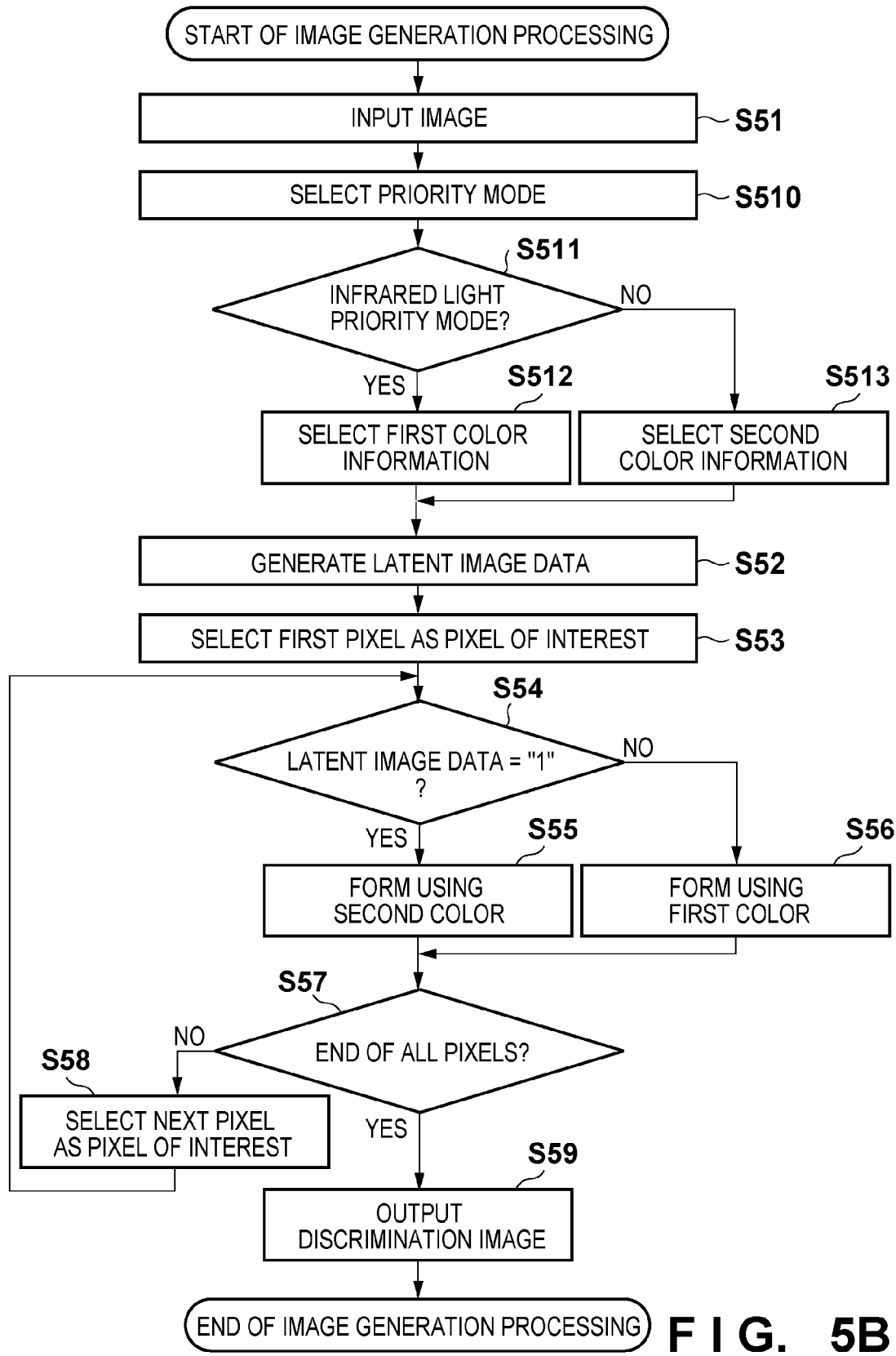

In this modification, both the first color information and second color information are registered in the color information holding unit 46 in the image generation apparatus 41, and the image generation apparatus 41 selects one of the two pieces of color information to be used. A difference between this modification and the first embodiment is that the image generation apparatus 41 executes processing according to the flowchart shown in FIG. 5B in place of that according to the flowchart shown in FIG. 5A. Hence, the processing shown in FIG. 5B will be described below. Note that the same step numbers in FIG. 5B denote the same steps as those shown in FIG. 5A, and a description thereof will not be repeated.

In step S510, the discrimination image data generation unit 44 accepts designation of one of a mode using the first color information (infrared light priority mode) and that using the second color information (ordinary light priority mode). The infrared light priority mode prioritizes an increase in lightness difference under infrared light over a color difference (lightness or tincture difference) between the first and second regions under ordinary light. On the other hand, the ordinary light priority mode prioritizes a decrease in tincture under ordinary light over a lightness difference between the first and second regions under infrared light.

The mode may be selected by the user via a user interface (not shown) or the print target image input in step S51 may be analyzed, and the mode may be selected according to an analysis result. For example, the number of tones used in the print target image may be analyzed. Then, in case of an image in which the number of tones is larger than a prescribed value (for example, a photo), the ordinary light priority mode may be selected; in case of an image in which the number of tones is smaller than the prescribed value (for example, a graphic or illustration), the infrared light priority mode may be selected. Alternatively, it may be determined whether or not the print target image includes a region where tones change continuously. If the image includes such region, the ordinary light priority mode may be selected; otherwise, the infrared light priority mode may be selected.

The discrimination image data generation unit 44 judges in step S511 which mode is selected. As a result of this judgment, if the infrared light priority mode is selected, the process advances to step S512; if the ordinary light priority mode is selected, the process advances to step S513.

In step S512, the discrimination image data generation unit 44 acquires the first color information from the color information holding unit 46. On the other hand, in step S513, the discrimination image data generation unit 44 acquires the second color information from the color information holding unit 46. Then, in step S52 and subsequent steps, the processes are executed using the selected color information.

As described above, according to this modification, one of a discrimination image which prioritizes a decrease in color difference between the first and second regions under ordinary light, and that which prioritizes an increase in lightness difference under infrared light, can be selectively generated according to the intention of the user. Alternatively, one of the modes can be automatically selected according to an input image, and a discrimination image can be generated in the mode suited to the image.

[Second Embodiment]

Figure 7:
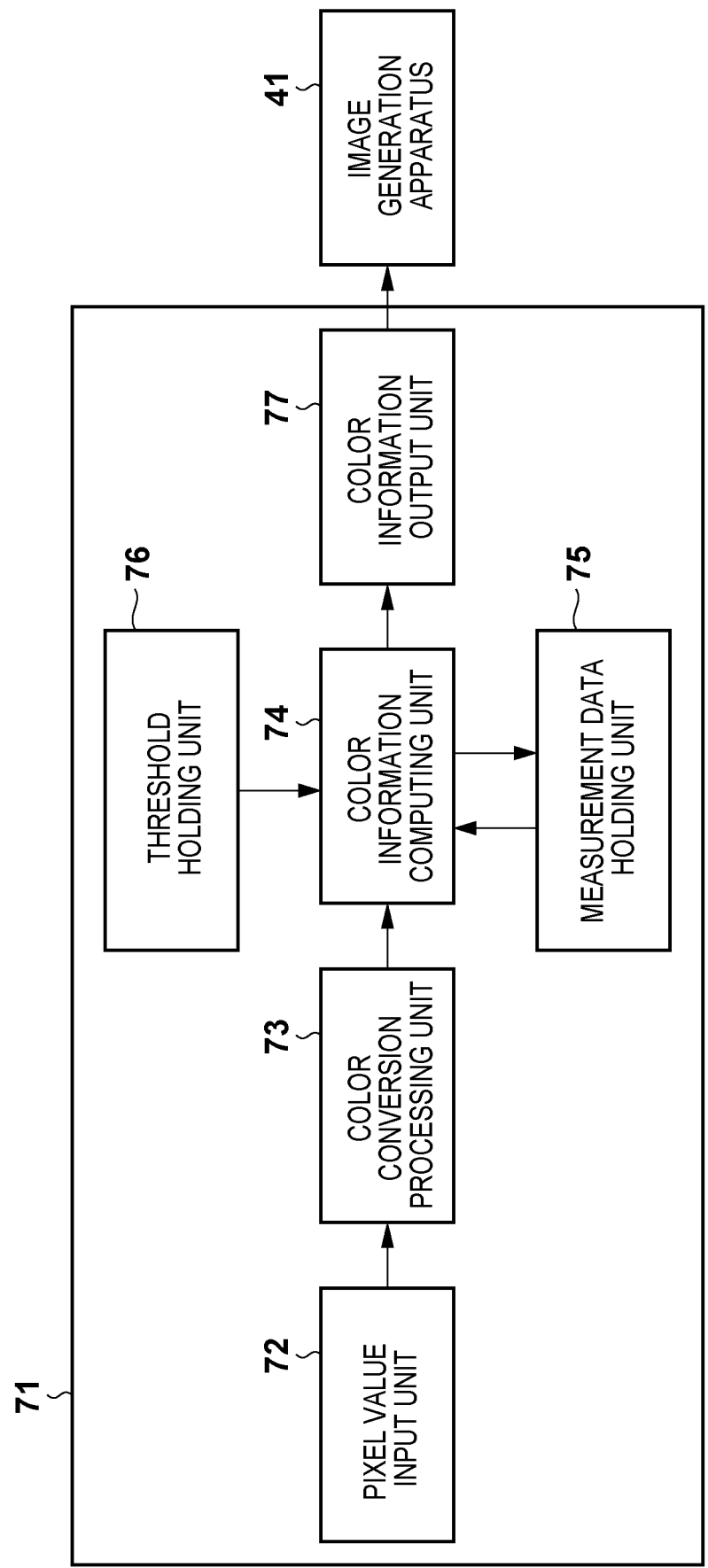
FIG. 7 is a block diagram showing an example of the functional arrangement of a color information generation apparatus 71.

Respective units which configure the image generation apparatus 41 shown in FIG. 4 and the color information generation apparatus 71 shown in FIG. 7 may be implemented by hardware. Alternatively, the color information holding unit 46, threshold holding unit 76, and measurement data holding unit 75 may be implemented using a memory, and the remaining units may be implemented by software. In this case, to a computer which has this memory and executes this software, a computer 31 having an arrangement shown in FIG. 3 is applicable.

A monitor 32 includes a CRT or liquid crystal panel, and can display processing results of a CPU 33 as images and characters. The CPU 33 controls the overall operations of the computer 31 using computer programs and data stored in a ROM 34 and RAM 35, and executes the aforementioned processes described above as those to be implemented by the image generation apparatus 41 and color information generation apparatus 71.

The ROM 34 stores setting data, a boot program, and the like of the computer 31. The ROM 34 may be controlled to function as the color information holding unit 46, threshold holding unit 76, measurement data holding unit 75, and the like.

The RAM 35 has an area used to temporarily store computer programs and data loaded from an HD (hard disk) 36, CD drive 37, FD drive 38, and DVD drive 39. Furthermore, the RAM 35 has a work area used when the CPU 33 executes various kinds of processing. That is, the RAM 35 can provide various areas as needed.

The HD 36 serves as a large-capacity information storage device. The HD 36 saves an OS (Operating System) and computer programs and data required to control the CPU 33 to execute functions of the respective units (except for those to be implemented using the memory) included in the apparatus to which the computer 31 is applied. Furthermore, the HD 36 saves given information in the above description. The computer programs and data saved in the HD 36 are loaded onto the RAM 35 under the control of the CPU 33 as needed, and are to be processed by the CPU 33. Note that the HD 36 may be controlled to function as the color information holding unit 46, threshold holding unit 76, measurement data holding unit 75, and the like.

The CD drive 37 reads out computer programs and data recorded on a CD-ROM, and outputs them to the RAM 35 and HD 36. The FD drive 38 reads out computer programs and data recorded on an FD, and outputs them to the RAM 35 and HD 36. The DVD drive 39 reads out computer programs and data recorded on a DVD-ROM, and outputs them to the RAM 35 and HD 36. Note that the respective recording media may record some of various pieces of information described as those saved in the HD 36.

To an I/F (interface) 310, a printer 311 as a printing apparatus is connected, and the computer 31 communicates with the printer 311 via this I/F 310. To an I/F 314, a mouse 312 and keyboard 313 are connected. The user can notify the CPU 33 of various instructions via the I/F 314 by making operations using the mouse 312 and keyboard 313.

The monitor 32, CPU 33, ROM 34, RAM 35, HD 36, CD drive 37, FD drive 38, DVD drive 39, and I/Fs 310 and 314 are connected to a bus 315.

Note that the arrangement shown in FIG. 3 is merely an example of that of a computer which is applicable to the image generation apparatus 41 and color information generation apparatus 71. New components may be added to the arrangement shown in FIG. 3 as needed, or appropriate components of the arrangement shown in FIG. 3 may be omitted depending on the situation. Some of processes to be executed by one component may be shared by other components.

Note that the computer 31 shown in FIG. 3 may be applied to the image generation apparatus 41 and color information generation apparatus 71 independently, or when the image generation apparatus 41 and color information generation apparatus 71 are built in a single apparatus, the computer 31 may be applied to this apparatus.

Note that the aforementioned embodiments have exemplified the case in which inks are applied. However, the aforementioned embodiments are not limited to the inks, but are applicable to arbitrary color materials including toners. That is, in the aforementioned embodiments, "inks" (first ink group, second ink group, and third ink group) may be read as "color materials" (first color material group, second color material group, and third color material group).

To summarize the aforementioned embodiments, an image processing apparatus according to the embodiment is that which outputs print image data to a print unit that prints an image by adhering printing color materials to a printing medium. This image processing apparatus holds first color information configured by a combination of color materials having a low infrared absorption rate, and second color information configured by a combination of at least two types of color materials which have a high infrared absorption rate and have different tinctures under ordinary light. More specifically, the image processing apparatus holds the first color information and second color information, each of which sets a color difference under ordinary light to be equal to or smaller than a pre-set threshold. Then, the image processing apparatus generates binary latent image data, and outputs, according to a value of each pixel of the generated latent image data, one of the held first color information and second color information to the print unit as print data of that pixel. Note that the color materials included in the first color information include a color material which has a larger lightness value than a color material having a largest lightness value as a single color material of those included in the second color information. Also, the second color information is configured by a combination of first color materials when a lightness value under ordinary light of the second color information is equal to or larger than the threshold, and is configured by a combination of second color materials when the lightness value is smaller than the threshold.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-259520 filed Nov. 19, 2010 which is hereby incorporated by reference herein in its entirety.

What is claimed is:

1. An image processing apparatus comprising:
a first holding unit that holds sets of color values acquired by measuring, in advance, colors of patterns printed using a first color material group including color materials of a plurality of colors by use amounts being set for the respective color materials, and the use amounts being set for the respective color materials of the first color material group, for respective combinations of use amounts being allowed to be set for the respective color materials of the first color material group;
a second holding unit that holds sets of color values acquired by measuring, in advance, colors of patterns printed using a second color material group, which includes a color material having a higher infrared ray absorption rate than any of the plurality of color materials, by use amounts of being set for respective color materials included in the second color material group, and the use amounts being set for the respective color materials of the second color material group, for respective combinations of use amounts being allowed to be set for the respective color materials of the second color material group;
a third holding unit that holds sets of color values acquired by measuring, in advance, colors of patterns printed using a third color material group, which includes a color material having a higher lightness level than any of the color materials included in the second color material group and a higher infrared ray absorption rate than any of the plurality of color materials, and a color material having a higher infrared ray absorption rate than any of the plurality of color materials, by use amounts of being set for respective color materials included in the third color material group, and use amounts being set for the respective color materials of the third color material group, for respective combinations of use amounts being allowed to be set for the respective color materials of the third color material group;
a unit that selects one pixel value from a pixel value group, which is set in advance, as a selected pixel value;
a first calculation unit that specifies color values, differences from a color value of the selected pixel value of which fall within a prescribed range, from a color value group held by said first holding unit on a color space to which the color value group belongs, specifies use amounts held by said first holding unit to be set with the specified color values, and calculates use amounts of respective color materials used when a pixel having the selected pixel value is printed using the first color material group by interpolation from the specified use amounts;
a second calculation unit that specifies color values, differences from the color value of the selected pixel value of which fall within a prescribed range, from a color value group held by said second holding unit on a color space to which the color value group belongs, specifies use amounts held by said second holding unit to be set with the specified color values, and calculates use amounts of respective color materials used when a pixel having the selected pixel value is printed using the second color material group by interpolation from the specified use amounts;
a third calculation unit that specifies color values, differences from the color value of the selected pixel value of which fall within a prescribed range, from a color value group held by said third holding unit on a color space to which the color value group belongs, specifies use amounts held by said third holding unit to be set with the specified color values, and calculates use amounts of respective color materials used when a pixel having the selected pixel value is printed using the third color material group by interpolation from the specified use amounts; and
a storage unit that stores, in a memory, the use amounts of the respective color materials of the first color material group calculated by said first calculation unit, and the use amounts of the respective color materials of the third color material group calculated by said third calculation unit in association with the selected pixel value, when a lightness level expressed by the selected pixel value is not less than a threshold, and stores, in the memory, the use amounts of the respective color materials of the first color material group calculated by said first calculation unit and the use amounts of the respective color materials of the second color material group calculated by said second calculation unit in association with the selected pixel value, when the lightness level expressed by the selected pixel value is smaller than the threshold.

2. The apparatus according to claim 1, wherein when the lightness level expressed by the selected pixel value is not less than the threshold and is not more than another threshold larger than the threshold, said storage unit decreases a use amount of the color material having the higher lightness level than any of the color materials included in the second color material group and the higher infrared ray absorption rate than any of the plurality of color materials by a prescribed amount before said storage unit stores, in the memory, the use amounts of the respective color materials of the third color material group calculated by said third calculation unit.

3. The apparatus according to claim 1, wherein the interpolation is tetrahedral interpolation.

4. An image processing method executed by an image processing apparatus, which comprises:
a first holding unit that holds sets of color values acquired by measuring, in advance, colors of patterns printed using a first color material group including color materials of a plurality of colors by use amounts being set for the respective color materials, and the use amounts being set for the respective color materials of the first color material group, for respective combinations of use amounts being allowed to be set for the respective color materials of the first color material group;
a second holding unit that holds sets of color values acquired by measuring, in advance, colors of patterns printed using a second color material group, which includes a color material having a higher infrared ray absorption rate than any of the plurality of color materials, by use amounts of being set for respective color materials included in the second color material group, and the use amounts being set for the respective color materials of the second color material group, for respective combinations of use amounts being allowed to be set for the respective color materials of the second color material group; and
a third holding unit that holds sets of color values acquired by measuring, in advance, colors of patterns printed using a third color material group, which includes a color material having a higher lightness level than any of the color materials included in the second color material group and a higher infrared ray absorption rate than any of the plurality of color materials, and a color material having a higher infrared ray absorption rate than any of the plurality of color materials, by use amounts of being set for respective color materials included in the third color material group, and use amounts being set for the respective color materials of the third color material group, for respective combinations of use amounts being allowed to be set for the respective color materials of the third color material group,
the method comprising:
a step of selecting one pixel value from a pixel value group, which is set in advance, as a selected pixel value;
a first calculation step of specifying color values, differences from a color value of the selected pixel value of which fall within a prescribed range, from a color value group held by the first holding unit on a color space to which the color value group belongs, specifying use amounts held by the first holding unit to be set with the specified color values, and calculating use amounts of respective color materials used when a pixel having the selected pixel value is printed using the first color material group by interpolation from the specified use amounts;

a second calculation step of specifying color values, differences from a color value of the selected pixel value of which fall within a prescribed range, from a color value group held by the second holding unit on a color space to which the color value group belongs, specifying use amounts held by the second holding unit to be set with the specified color values, and calculating use amounts of respective color materials used when a pixel having the selected pixel value is printed using the second color material group by interpolation from the specified use amounts;

a third calculation step of specifying color values, differences from a color value of the selected pixel value of which fall within a prescribed range, from a color value group held by the third holding unit on a color space to which the color value group belongs, specifying use amounts held by the third holding unit to be set with the specified color values, and calculating use amounts of respective color materials used when a pixel having the selected pixel value is printed using the third color material group by interpolation from the specified use amounts; and a storage step of storing, in a memory, the use amounts of the respective color materials of the first color material group calculated in the first calculation step, and the use amounts of the respective color materials of the third color material group calculated in the third calculation step in association with the selected pixel value, when a lightness level expressed by the selected pixel value is not less than a threshold, and storing, in the memory, the use amounts of the respective color materials of the first color material group calculated in the first calculation step and the use amounts of the respective color materials of the second color material group calculated in the second calculation step in association with the selected pixel value, when the lightness level expressed by the selected pixel value is smaller than the threshold.

5. A non-transitory computer-readable storage medium storing a computer program for controlling a computer to function as respective units of an image processing apparatus of claim 1.

6. An image processing apparatus for outputting print image data to a print unit that prints an image by adhering printing color materials to a printing medium, said apparatus comprising:

a holding unit that holds first color information configured by a combination of color materials having a low infrared absorption rate, and second color information configured by a combination of at least two types of color materials, which have a high infrared absorption rate and have different tinctures under ordinary light, each of the first color information and the second color information setting a color difference under ordinary light to be not more than a threshold, which is set in advance;

a generation unit that generates binary latent image data; and an output unit that outputs, according to a value of each pixel of the latent image data generated by said generation unit, one of the first color information and the second color information held by said holding unit to the print unit as print data of that pixel, wherein the color materials included in the first color information include a color material having a higher lightness level than a color material having a largest lightness level as a single color material of the color materials included in the second color information, and the second color information is configured by a combination of first color materials when a lightness level of the second color information under ordinary light is not less than a threshold, and is configured by a combination of second color materials when the lightness level is smaller than the threshold.

* * * * *